United States Patent

Edwards et al.

[15] 3,674,816

[45] July 4, 1972

[54] ANNULENE STEROIDS, INTERMEDIATES, AND METHOD OF MAKING

[72] Inventors: John A. Edwards, Los Altos; John H. Fried, Palo Alto; William McCrae, Los Altos, all of Calif.

[73] Assignee: Syntex Corporation, Panama, Panama

[22] Filed: Jan. 28, 1970

[21] Appl. No.: 14,571

Related U.S. Application Data

[63] Continuation-in-part of Ser. No. 714,078, March 18, 1968.

[52] U.S. Cl. ............260/397.4, 260/239.55, 260/397.3
[51] Int. Cl. ........................ C07c 171/07, C07c 169/20,
[58] Field of Search ............................................260/397.4

[56] References Cited

UNITED STATES PATENTS 3,185,681   5/1965   Knox ..................................260/239.5
3,253,005   5/1966   Knox ..................................260/397.45

Primary Examiner—Elbert L. Roberts
Attorney—Evelyn K. Merker, Gerard A. Blaufarb and Lawrence S. Squires

[57] ABSTRACT

3-Keto-5,19-cyclo-androsta-1,7-diene and -1,6-diene steroids; 3-lower alkoxy-5,19-cyclo-5,10-secoandrosta-1(10),2,4,7-tetraene and -1(10),2,4,6-tetraene steroids; 3-carboxylic acyloxy-5,19-cyclo-5,10-seco-androsta-1(10),2,4,7-tetraene and -1(10),2,4,6-tetraene steroids; and 3-desoxy-5,19-cyclo-5,10-seco-androsta-1(10),2,4,7-tetraene and -1(10),2,4,6-tetraene steroids and methods of preparing these steroids and converting them to useful 5,10-sec-5,19-cycloandrosta-(10),2,4,6-pentaene steroids. The above compounds have utility as intermediates in the production of 5,10-sec-5,19-cycloandrosta-1(10),2,4,6-pentaene steroids which have utility in the treatment of conditions related to estrogen deficiencies and in the control and regulation of fertility.

25 Claims, No Drawings

ANNULENE STEROIDS, INTERMEDIATES, AND METHOD OF MAKING

CROSS REFERENCE TO RELATED APPLICATIONS

This application is a continuation-in-part of U.S. Ser. No. 714,078 filed Mar. 18, 1968.

BACKGROUND OF THE INVENTION

This invention relates to steroid compounds and to methods of making steroid compounds. In a further aspect, this invention relates to 3-keto-5,19-cyclo-1,7-diene and 1,6-diene steroids; 3-lower alkoxy-5,19-cyclo-5,10-seco-1(10), 2,4,7-tetraene and -1(10),2,4,6-tetraene steroids; and 3-carboxylic acyloxy-5,19-cyclo-5,10-seco-1(10),2,4,7-tetraene and -1(10),2,4,6-tetraene; 3-desoxy-5,10-sec-5,19-cyclo-1(10), 2,4,7-tetraene and -1(10),2,4,6-tetraene steroids and methods of preparing these steroids and converting them to 5,10-seco-5,19-cyclo-androstenes. In a still further aspect this invention relates to methods of making 5,10-seco-5,19-cycloandrosta-1 (10),2,4,6,8In the parent application, cited hereinabove, we have disclosed 5,19-cycloandrosta-1(10),2,4,6,8-pentaene compounds having the formula:

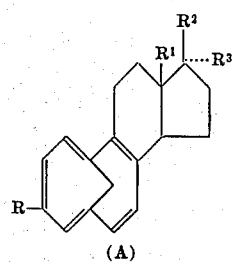

(A)

wherein R is H, or lower alkoxy, or carboxylic acyloxy; $R^1$ is methyl or ethyl; $R^2$ is hydroxy, hydrolyzable carboxylic esters, tetrahydropyran-2'-yloxy, or tetrahydrofuran-2'-yloxy; $R^3$ is hydrogen, lower alkyl, lower alkenyl, lower alkynyl, lower alkoxy, carboxylic acyloxy, lower haloalkynyl, cyclopropyl, dichlorocyclopropyl, difluorocyclopropyl, propadienyl, dichlorocyclopropenyl or dichlorocyclopropenyl; and $R^2$ and $R^3$ taken together can be oxo.

The above compounds of Formula (A) possess estrogenic and anti-fertility activity and are useful in the treatment of estrogen deficiencies and in the control and regulation of fertility. By reason of their anti-fertility activity, they are useful for the control of pests, for example, rodents such as rats, mice, nutria, rabbits and the like. For this purpose, the compounds are admixed with a suitable bait such as grain, salmon, and the like, and placed in an area accessible to the rodents. The amount of anti-fertility agent incorporated into the bait is not critical so long as it does not exceed the limit above which the rodent can detect the presence of the agent. The anti-fertility agent/bait mixture is preferably made available to the pest on, for example, alternate days in an amount which, by past experience, can be expected to be entirely consumed in 2 days. Edible carriers suitable as a bait include liquids, solids and mixtures thereof such as water, milk, molasses, corn oil, peanut oil, cottonseed oil, sugar, peanut butter, chicken mash, dairy mixes, corn, oats, wheat, bran, meat, fish, lard, chopped grass or hay, cheese, salt, and the like. In addition, conventional pest attractants and other additives normally employed in baits can be added. The compositions of the anti-fertility agent and bait can be prepared, for example, as a granular mix, as a paste, as a syrup, in the form of pellets for ease of application, and the like. Other forms of carriers can also be used such as forming a solution, e.g., a salt solution, or mixture containing a small amount of the anti-fertility agent, and impregnating a suitable carrier such as cellulosic materials, e.g., wood, with the solution.

We have accordingly discovered intermediates useful for the preparation of the compounds of Formula (A) and felicious processes for preparing these intermediate compounds and converting the intermediates to the compounds of Formula (A).

SUMMARY

In summary of the compounds of our invention can be represented by the name formulas, 3-keto-5,19-cyclo-androsta-1,7-diene,
3-keto-5,19-cyclo-androsta-1,6-diene,
3-lower alkoxy-5,19-cyclo-5,10-seco-androsta-1(10),2,4,7-tetraene,
3-desoxy-5,19-cyclo-5,10-seco-androsta-1(10),2,4,7-tetraene,
3-carboxylic acyloxy-5,19-cyclo-5,10-seco-androsta-1 (10),2,4,7-tetraene,
3-lower alkoxy-5,19-cyclo-5,10-seco-androsta-1(10),2,4,6-tetraene,
3-desoxy-5,19-cyclo-5,10-seco-androsta-1(10),2,4,6-tetraene,
3-carboxylic acyloxy-5,19-cyclo-5,10-seco-androsta-1 (10),2,4,6-tetraene,
and derivatives thereof.

In summary the process of our invention for preparing the compounds of our invention comprises: (a) treating a 3-keto-19-hydroxy-androsta-4,6-diene or derivative thereof with an alkali metal alkoxide and a dialkyl sulfoxide to provide the corresponding 3-keto-19-hydroxy-androsta-4,7-diene; (b) treating the 3-keto-19-hydroxy-androsta-4,7-diene or 3-keto-19-hydroxy-androsta-4,6-diene steroids with a halogenated amine to, respectively, provide the corresponding 3-keto-5,19-cyclo-androsta-1,7-diene or -1,6-diene steroids of our invention; and (c) treating the 3-keto-5,19-cycloandrosta-1,7-diene or -1,6-diene steroids with a lower trialkoxy orthoformate in the presence of an acid catalyst to provide the corresponding 3-lower alkoxy-5,10-seco-5,19-cycloandrosta-1 (10),2,4,7-tetraene or -1(10),2,4,6-tetraene steroids of our invention; or treating the 3-keto-5,19-cyclo-androsta-1,7-diene, or -1,6-diene steroids with a carboxylic acid anhydride in the presence of an acid catalyst to afford, respectively, the corresponding 3-carboxylic acyloxy-5,10-seco-5,19-cyclo-androsta-1(10),2,4,7-tetraene or -1(10),2,4,6-tetraene steroids of our invention. The corresponding 3-desoxy steroids of our invention can be prepared by converting the 3-keto-5,19-cyclo-androsta diene compounds of our invention to the corresponding 3-hydroxy compound followed by dehydration.

In summary the process according to our invention of preparing the estrogenic or anti-fertility compounds of Formula (A) comprises treating the 3-lower alkoxy or 3-carboxylic acyloxy or 3-desoxy-5,10-seco-5,19-cyclo-1(10),2,4,7-tetraene or steroids of our invention with a N-haloimide, such as, for example, N-bromosuccinimide, and an alkali metal carbonate to provide, respectively, the corresponding 3-lower alkoxy-5,10-seco-5,19-cyclo-androsta-1(10),2,4,6,8-pentaene or 3-carboxylic acyloxy-5,10-seco-5,19-cyclo-androsta-1 (10),2,4,6,83-desoxy-5,10-seco-5,19-cyclo-androsta-1(10),2,4,6,8-pentaene steroids of Formula (A). Alternatively, the compounds of Formula (A) can be prepared according to our invention from 3-keto-19-hydroxy-4,6-steroids via processes comprising the sequence of steps enumerated above.

The compounds and processes of our invention will be further described hereinbelow.

DETAILED DESCRIPTION OF THE INVENTION AND PREFERRED EMBODIMENTS

The compounds of our invention can be represented by the following formulas:

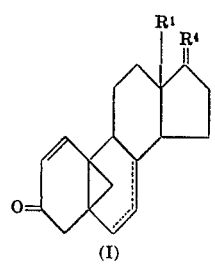

(I)

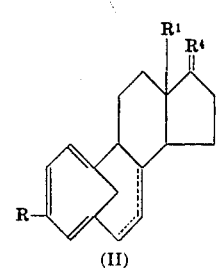

(II)

wherein R is H, lower alkoxy, or carboxylic acyloxy group; R¹ is methyl or ethyl; R⁴ is oxo or the group

wherein R² is hydroxy, hydrolyzable carboxylic esters, tetrahydropyran-2'-yloxy, or tetrahydrofuran-2'-yloxy; and R³ is H, lower alkyl, lower alkenyl, lower alkoxy, carboxylic acyloxy, lower alkynyl, lower haloalkynyl, cyclopropyl, dichlorocyclopropyl, difluorocyclopropyl, propadienyl, dichlorocyclopropynyl or difluorocyclopropynyl; and the bond line indicates 6(7)-ene or 7(8)-ene double bond.

The following terms as used herein, above and below, have the following meanings. The term "carboxylic acyloxy," refers to acyloxy groups conventionally employed in the synthetic hormone art containing from one to 12 carbon atoms. Typical carboxylic acyloxy ester groups include, for example, acetate, propionate, butyrate, valerate, caproate, enanthate, benzoate, diphenylacetate, diethylacetate, trimethylacetate, and the like. The term "lower alkyl" refers to straight and branched saturated aliphatic groups containing from one through six carbon atoms such as, for example, methyl, ethyl, isopropyl, and the like. The term "lower alkoxy" refers to straight and branched chain alkoxy groups containing from one through six carbon atoms such as, for example, methoxy, ethoxy, propionoxy, and the like. The term "lower alkenyl" refers to monoethylenically unsaturated aliphatic groups containing from three through six carbon atoms such as, for example, vinyl, propenyl, and the like. The term "lower alkynyl" refers to acetylenic unsaturated groups containing from two through six carbon atoms such as, for example, ethynyl, propynyl, and the like. The term "lower haloalkynyl" refers to a halogen substituted lower alkynyl such as, for example, chloroethynyl, fluoroethynyl, trifluoromethylethynyl, and the like containing from two through six carbon atoms. The terms "dichlorocylopropyl" and "difluorocyclopropyl" refer to the group:

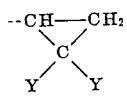

wherein Y is chloro or fluoro. The terms "dichlorocyclopropenyl" and "difluorocyclopropenyl" refer to the group:

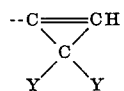

wherein Y is chloro or fluoro.

The processes of our invention can be represented by the following overall schematic reaction equations; wherein the steroid compounds are represented by partial formulas.

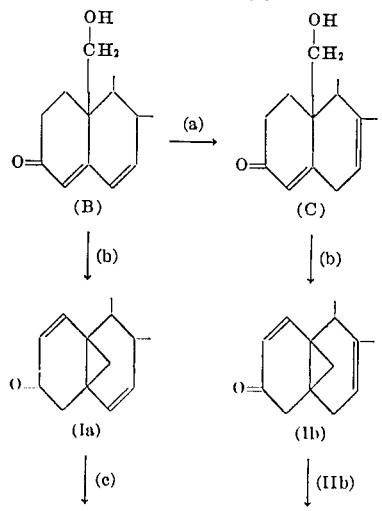

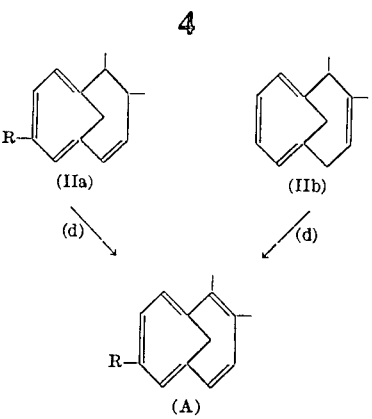

wherein R is as defined hereinabove.

Considering now the processes of our invention in greater detail, with reference to the above schematic equations, process (a) is performed by treating a suitable 3-keto-19-hydroxy-4,6-diene steroid (Formula B) starting material with a mixture of an alkali metal alkoxide and dialkyl sulfoxide. This treatment is typically carried out at temperatures in the range of about from 20° to 0° C. for about from 0.5 to 3 minutes. Best results are obtained using temperatures in the range of about from 10° to 0° C. and treatment times of about from 0.5 to 1 minute. The reaction mixture is then typically cooled to about from 0° to −80° C. and preferably about −80° C. and then treated with cold, preferably about 0° C., dilute aqueous mineral acid, typically dilute aqueous hydrochloric acid. The reaction is preferably carried out under an inert atmosphere such as, for example, nitrogen or argon. The relative ratio of reactants is not critical but typically will be in the range of about from 1 to 7 moles of alkoxide per mole of 3-keto-19-hydroxy-4,6-diene steroid and for best results about from 3 to 5. The 3-keto-19-hydroxy-4,7-diene steroid product of Formula (C) can then be recovered and purified by chromatography and/or crystallization.

The 3-keto-19-hydroxy-4,6-diene starting materials are known material and can be obtained from commercial sources or prepared according to known procedures such as, for example, as described in Deghenghi et al., Steroids, Vol. 10, page 313 (1967). Suitable alkali metal alkoxides which can be used include, for example, the alkoxides of sodium, potassium, and lithium; and preferably lower alkoxides of from one through four carbon atoms such as, for example, sodium methoxide, potassium methoxide, potassium propoxide, potassium t-butoxide, lithium butoxide, and the like. Suitable dialkyl sulfoxides which can be used include, for example, dimethyl sulfoxide, diethyl sulfoxide, diisopropyl sulfoxide, and the like. Best results are obtained using dimethyl sulfoxide, preferably with potassium t-butoxide.

The 3-keto-5,19-cyclo-1,7-diene steroid compounds of Formula (Ib) of our invention are prepared; according to our process (reaction (b)) by treating the corresponding compounds of Formula (C) with a 2-chloro-1,1,2-trifluoroalkyl dialkylamine, typically in the presence of an inert liquid organic reaction medium. The -1,6-diene steroids of our invention are prepared according to the same treatment but using the -1,6 steroid of Formula (B) as the starting material. Suitable dialkylamines include, for example, 2-chloro-1,1,2-trifluoroethyl diethylamine; 2-chloro-1,1,2-trifluoroethyl dimethylamine; 2-chloro-1,1,2-trifluoroethyl diisopropylamine; and the like. Suitable organic reaction media include, for example, tetrahydrofuran, dioxane, dimethylformamide, n-hexane, toluene, benzene, mesitylene, diethylether, acetonitrile, and the like. In both instances the treatment is typically conducted at temperatures in the range of about from 20° C. to the reflux temperature of the reaction system for a sufficient period time to obtain a significant quantity of product; typically about from one-half to 5 hours. Best results are obtained by using the reflux temperature of the system. The relative ratio of reactants is not critical, but typically will be in the range of about from 1 to 3.5 moles of 2-chloro-1,1,2-trifluoroalkyl dialkylamine per mole of -1,7-diene or -1,6-diene steroid and for best results about from 1 to 1.5 moles per mole of steroid. The desired product of Formula (I) can then be separated from the reaction mixture and further purified by chromatography and/or crystallization.

The compounds of Formula IIa and IIb, of our invention, can be prepared according to the process of our invention (reaction (c) in the above schematic equations) by treating the corresponding compounds of Formula Ia and Ib, respectively, with a lower trialkoxy orthoformate, if the compounds of Formula (II) wherein R is an alkoxy are desired; or with a lower carboxylic acid anhydride if the compounds of Formula (II) wherein R is a carboxylic acyloxy group are desired. In either case, the treatment is conducted in the presence of an acid catalyst. Suitable trialkoxy formates which can be used include, for example, trimethyloxy orthoformate, triethyloxy orthoformate, triisopropyloxy orthoformate, and the like. Suitable carboxylic acid anhydrides include, for example, acetic anhydride, propionic anhydride, butyric anhydride, benzoic anhydride, trichloroacetic anhydride and those acid anhydrides corresponding to the carboxylic acids as defined hereinabove. Suitable acid catalysts include, for example, acylsulfonic acids such as, for example, p-toluenesulfonic acid, sulfosalicylic acid dinitrobenzene sulfonic acid, benzene sulfonic acid, and the like. The treatment in each instance is typically conducted at temperatures in the range of about from 20° to 75° C. for a period of time sufficient to produce a specific quantity of product, typically from about one-half to 24 hours. The relative ratio of reactants is not critical but typically will be in the range of from 20 to 500 moles of orthoformate or anhydride per mole of -1,7-diene or -1,6-diene steroid. The desired products of Formula (II) can then be separated from the reaction mass and further purified by chromatography and/or crystallization.

The 3-desoxy compounds of Formula II can be prepared, according to our process, by converting the corresponding 3-keto compounds of Formula I to the corresponding 3-hydroxy compound and then treating these compounds with an acid catalyst to afford the corresponding 3-desoxy compounds of Formula II. This process can be represented, using partial steroid formulas, by the following schematic reaction equation:

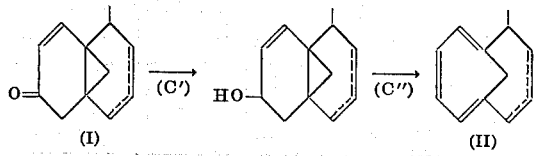

Any suitable treatment for effecting the conversion or reduction to the corresponding 3-hydroxy compound (i.e., step C') can be used. We have found that this conversion can, for example, be conveniently effected by treating the 3-keto compound of Formula I with a mixture of aluminum alkoxide in a suitable inert organic solvent. This treatment is typically conducted at temperatures in the range of about from 75° C. to the reflux temperature for about from one-half to 24 hours. Best results are generally obtained using the reflux temperature of the system. The ratio of reactants will typically be in the range of about from 1 to 9 mole equivalents of aluminum alkoxide (i.e., 1 mole = 3 equivalents) per mole of ketone. Suitable inert organic solvents include, for example, isopropyl alcohol, toluene, xylene and the like. Suitable aluminum alkoxides include, for example, aluminum isopropoxide, aluminum ethoxide and the like; best results are obtained with aluminum isopropoxide. The 3-hydroxy product can be recovered and purified by any suitable procedure such as, for example, filtration, crystallization and chromatography. The conversion of the 3-hydroxy compound to the corresponding 3-desoxy compound of Formula II can be effected by treating the 3-hydroxy compound with an acylsulfonic acid in a suitable inert liquid organic media. Suitable acylsulfonic acids, include for example, p-toluenesulfonic acid, dinitrobenzene sulfonic acid, benzene sulfonic acid, and the like. Suitable inert organic media include, for example, benzene, toluene, chloroform and the like. The treatment is typically conducted at temperatures in the range of about from 15° to 75° C. for about from one-half to 24 hours. The 3-desoxy product, of Formula II, can be recovered and purified by any suitable procedure, for example, evaporation, chromatography and crystallization.

The compounds of our invention (Formulas I and II) wherein $R^3$ is dihalocyclopropenyl or dihalocyclopropyl can be prepared by treating the corresponding 17α-ethynyl or 17α-vinyl compound, respectively, of Formulas I and II with a dihalocarbene, such as, for example, generated from sodium trichloroacetate or sodium chlorodifluoroacetate. The 17α-alkyl, 17α-alkenyl and 17α-alkynyl compounds of our invention (i.e., $R^3$ is alkyl, alkenyl or alkynyl) can be prepared from the corresponding 17-keto compounds of our invention by any suitable procedure for effecting this substitution such as, for example, described in U.S. Pat. No. 3,257,427. The 17α-cyclopropyl can be prepared by treating the corresponding 17-keto compounds of our invention according to a Grignard type reaction, for example, by treatment with cyclopropyl-magnesium halide.

The 3-carboxylic acyloxy compounds of Formula II wherein R is carboxylic acyloxy and $R^4$ is the group

wherein $R^2$ is OH and $R^3$ is selected from the group consisting of lower alkenyl, lower alkynyl, lower haloalkynyl, cyclopropyl, dichlorocyclopropyl, difluorocyclopropyl and propadienyl, dichlorocyclopropynyl, difluorocyclopropynyl, can also be prepared according to our invention, by treating the corresponding compounds of Formula II, wherein R is lower alkoxy, $R^4$ is the group

wherein $R^2$ is OH and wherein $R^3$ corresponds to the $R^3$ group of said 3-carboxylic acyloxy compound, with an acylsulfonic acid selected from the group consisting of p-toluene-sulfonic acid, dinitrobenzene sulfonic acid, benzene sulfonic acid and sulfosalicylic acid, in an aqueous inert organic solvent at temperatures in the range of about from 75° C. to reflux for about from one-half to 24 hours, thereby forming the 17β-hydroxy-5 β,19-cyclo-androsta-dien-3-one steroid having the corresponding $R^3$ (17α) group and -1,7-diene or -1,6-diene unsaturation. This compound can then be treated with a carboxylic acid anhydride in the presence of acylsulfonic acid under reactive conditions to form the desired 3-carboxylic acyloxy compound of Formula II. This latter treatment can be conducted at temperatures in the range of about from 20° to 75° C. for about from ½ to 24 hours. Suitable carboxylic acid anhydrides include acetic anhydride, propionic anhydride, butyric anhydride, and benzoic anhydride. Suitable acylsulfonic acids include p-toluenesulfonic acid, dinitrobenzene sulfonic acid, benzene sulfonic acid, and sulfosalicylic acid.

The compounds of Formula (A) can be prepared according to our invention by treating the corresponding compounds of Formula (II) with a N-haloimide and an alkali metal carbonate. Suitable N-haloimides which can be used include, for example, N-bromosuccinimide, N-bromoacetamide, N,N-dibromo dimethylhydantoin, and the like. Suitable alkali metal carbonates which can be used include, for example, sodium carbonate, potassium carbonate, lithium carbonate, and the like. We have found that best results are obtained using lithium carbonate. The treatment is also typically performed in the presence of an inert liquid organic media. Suitable media include, for example, ethylene chloride, by chloroform, carbon tetrachloride, and the like. We have further found that it is desirable to initiate the reaction by irradiation, conveniently with visible light and/or ultra violet light. The treatment is typically conducted at temperatures in the range of about from 20° C. to the reflux temperature for a period of time sufficient to provide a significant amount of product, typically about from one-half to 2 hours. The relative ratio of reactants is not critical but typically will be in the range of about from 1 to 3 moles of N-bromosuccinimide or equivalent per mole of steroid and for best results about 1.2 molar equivalents. The product can then be conveniently separated from the reaction mixture and further purified by chromatography over silver nitrate impregnated silica gel and crystallization. Alternatively, the product of Formula (A) can be prepared, according to our invention, from the initial 3-keto-19-hydroxy-4,6-diene steroid compounds by sequentially following each of the above process steps (a) or (b) through (d). Preferably, though not necessarily, the respective product of each treatment is separated and purified prior to being used as starting material for the next process step.

In carrying out the above described treatments (steps a–d), the respective reagents are contacted and maintained together in any convenient manner, preferably for a period of time sufficient to complete the reaction or produce a substantial quantity of desired product within the given temperature range.

A further understanding of our invention can be had from the following examples; wherein molar quantities refer to gram moles.

EXAMPLE 1

This example illustrates a method according to our invention of preparing the compounds of Formula (B). In this example, 19.3 g. of 19-hydroxy-androsta-4,6-diene-3,17-dione is stirred in freshly distilled ($CaH_2$) dimethyl sulfoxide under nitrogen and 15 g. of sodium methoxide is then added. After one-half minute the reaction mixture is cooled using a solid carbon dioxide bath, and then after an additional one-fourth minute, 30 ml. of concentrated hydrochloric acid at 0° C. is added. The mixture is stirred for 2½ minutes and then 50 ml. of water containing 5 ml. of pyridine is added and the stirring continued for an additional 10 minutes. The mixture is then poured into 1 liter of water and the resulting precipitate is washed first with aqueous pyridine, then water, and then dried in vacuo. This yields a dry yellow powder of 19-hydroxy-androsta-4,7-diene-3,17-dione which is sufficiently pure to be used for subsequent reactions.

By following the above procedure using the corresponding 4,6-diene steroid starting materials, the following compounds of Formula (I) are prepared:

17β,19-dihydroxy-androsta-4,7-dien-3-one,
17β,19-dihydroxy-androsta-4,7-dien-3-one 17-valerate,
17β,19-dihydroxy-17α-methyl-androsta-4,7-dien-3-one 17-acetate,
18-methyl-19-hydroxy-androsta-4,7-diene-3,17-dione.

EXAMPLE 1(a)

In this example 1 g. millimole of 17β,19-dihydroxy-androsta-4,6-dien-3-one is added to 2 ml. of pyridine containing 1.5 g. millimoles of acetic anhydride. The mixture is allowed to stand to 20 hours at 20° C. and then poured into water. The resulting 19-hydroxy-androsta-4,7-dien-3-one 17β-acetate product is separated by extraction with ethyl acetate and purified by preparative thin layer chromatography eluting with a mixture of ethyl acetate and hexane.

19-Hydroxy-androsta-4,7-dien-3-one 17β-propionate is prepared by following the above procedure using propionic anhydride in place of acetic anhydride.

EXAMPLE 2

This example illustrates a method according to our invention of preparing the compounds of Formula (I) of our invention. In this example, 7.4 g. of 19-hydroxy-androsta-4,7-diene-3,17-dione is dissolved in 250 ml. of dry ($P_2O_5$-distilled) acetonitrile at 20° C. Six ml. of 2-chloro-1,1,2-trifluoroethyl diethylamine is added to the hot solution. The solution is heated at reflux for 1 hour and then cooled and diluted with ether and washed with water. The aqueous phase is extracted twice with ether and the ethereal phase is combined and washed with 5 percent aqueous sodium bicarbonate solution and then twice with water. The solution is dried and evaporated, and affords a brown oil residue which is chromatographed on grade-aluminum, and eluted with hexane, which yields a yellow oil and then diluted with 3:1 benzene: hexane resulting in practically pure 5β,19-cyclo-androsta-1,7-diene-3,17-dione.

By following the above procedures using the other products of Examples 1 and 1(a) as starting materials, the following compounds of Formula (II) are prepared;

17β-hydroxy-5β,19-cyclo-androsta-1,7-dien-3-one 17-propionate,
17β-hydroxy-5β,19-cyclo-androsta-1,7-dien-3-one 17-valerate,
17β-hydroxy-5β,19-cyclo-androsta-1,7-dien-3-one 17-acetate,
17β-hydroxy-17α-methyl-5β,19-cyclo-androsta-1,7-dien-3-one 17-acetate,
18-methyl-5β,19-cyclo-androsta-1,7-diene-3,17-dione.

By following the above procedure but using the corresponding 19-hydroxy-androsta-1,6-dienes as starting materials, the following compounds are prepared:

17β-hydroxy-5β,19-cyclo-androsta-1,6-dien-3-one 17-propionate,
17β-hydroxy-5β,19-cyclo-androsta-1,6-dien-3-one 17-valerate,
17β-hydroxy-5β,19-cyclo-androsta-1,6-dien-3-one 17-acetate,
17β-hydroxy-17α-methyl-5β,19-cyclo-androsta-1,6-dien-3-one 17-acetate,
18-methyl-5β,19-cyclo-androsta-1,6-diene-3,17-dione.

EXAMPLE 3

This example illustrates a method according to our invention of preparing 3-acyloxy compounds of Formula (II) of our invention. In this example, 508 mg. of 5β,19-cyclo-androsta-1,7-diene-3,17-dione and 314 mg. of p-toluenesul-fonic acid are dissolved in 20 ml. of acetic acid and 2 ml. of acetic anhydride. The mixture is allowed to stand for 3 hours at room temperature and then poured into 150 ml. of ice water with stirring. The stirring is continued until a precipitate is coagulated. The precipitate is then filtered off, washed with water and then dried. The residue is further purified by recrystallization from methanol resulting in a 3-acetoxy-5β,19-cyclo-5,10-seco-androsta-1(10),2,4,7-tetraen-17-one product.

By following the above procedures using the products of Example 2 as starting materials, the following compounds of Formula (II) are prepared;

3-acetoxy-5β,19-cyclo-5,10-seco-androsta-1(10),2,4,7-tetraen-17β-ol 17-propionate,
3-acetoxy-5β,19-cyclo-5,10-seco-androsta-1(10),2,4,7-tetraen-17β-ol valerate,
3,17β-diacetoxy-5β,19-cyclo-5,10-seco-androsta-1(10),2,4,7-tetraene,
3,17β-diacetoxy-17α-methyl-5β,19-cyclo-5,10-seco-androsta-1(10),2,4,7-tetraene,
3-acetoxy-18-methyl-5β,19-cyclo-5,10-seco-androsta-1(10),2,4,7-tetraen-17-one,
3-acetoxy-5β,19-cyclo-5,10-seco-androsta-1(10),2,4,6-tetraen-17β-ol 17-propionate,
3-acetoxy-5β,19-cyclo-5,10-seco-androsta-1(10),2,4,6-tetraen-17β-ol 17-valerate,
3,17β-diacetoxy-5β,19-cyclo-5,10-seco-androsta-1(10),2,4,6-tetraene,
3,17β-diacetoxy-17α-methyl-5β,19-cyclo-5,10-seco-androsta-1(10),2,4,6-tetraene,
3-acetoxy-18-methyl-5β,19-cyclo-5,10-seco-androsta-1(10),2,4,6-tetraen-16-one.

EXAMPLE 4

This example illustrates a method according to our invention of preparing the compounds of Formula (II) of our invention wherein RO is an alkoxide group. In this example, 480 mg. of 5β,19-cyclo-androsta-1,7-diene-3,17-dione is heated in 40 ml. of methanol containing 30 mg. of oxalic acid. Four milliliters of trimethyl orthoformate is then added and the mixture refluxed for 30 minutes. The mixture is then cooled, diluted with ether, washed with aqueous sodium bicarbonate, then with water, dried and evaporated affording a residue which is a mixture of 3-methoxy-5β,19-cyclo-5,10-seco-androsta-1(10),2,4,7-tetraene 17-dimethyl ketal and 3-methoxy-5β,19-cyclo-5,10-seco-androsta-1(10),2,4,7-tetraen-17-one. The residue is then chromatographed on grade III alumina and the 3-methoxy-5β,19-cyclo-5,10-seco-androsta-1(10),2,4,7-tetraene 17-dimethyl ketal fraction separated by elution with hexane and the 3-methoxy-5β,19-cyclo-5,10-seco-androsta-1(10),2,4,7-tetraen-17-one fraction separated by elution with a 4 to 1, by vol. mixture of hexane and benzene.

By following the above procedure, using the products of Example 2 as starting materials, the following -1(10),2,4,7-tetraene compounds of Formula (II) and their -1(10),2,4,6-tetraene counterparts are prepared:

3-methoxy-17β-hydroxy-5β,19-cyclo-5,10-seco-androsta-1(10),2,4,7-tetraene 17-propionate, 3-methoxy-17β-hydroxy-5β,19-cyclo-5,10-seco-androsta-1(10),2,4,7-tetraene 17-valerate, 3-methoxy-17β-hydroxy-5β,19-cyclo-5,10-seco-androsta-1(10),2,4,7-tetraene 17-acetate, 3-methoxy-17β-hydroxy-17α-methyl-5β,19-cyclo-5,10-seco-androsta-1(10),2,4,7-tetraene, 3-methoxy-18-methyl-5β,19-cyclo-5,10-seco-androsta-1(10),2,4,7-tetraene 17-dimethyl ketal, and 3-methoxy-18-methyl-5β,19-cyclo-5,10-seco-androsta-1(10),2,4,7-tetraen-17-one.

EXAMPLE 5

This example illustrates methods according to our invention of preparing 3-hydroxy derivatives of the compounds of Formula (I) of our invention and converting them to the 3-desoxy compounds of Formula II of our invention. In this example, a mixture of 5β,19-cyclo-androsta-1,7-dien-3β,17α-diols and -3β,17β-diols are prepared by heating 509 mg. of 5β,19-cyclo-androsta-1,7-diene-3,17-dione in 25 ml. of dry isopropanol containing 1 g. of redistilled aluminum isopropoxide. The reaction is carried out in a distillation apparatus operating at a temperature such that about 5 ml. of solvent is distilled in 3 hours. After 3 hours, the solution is allowed to cool, then poured into 250 ml. of ice water, containing 18 ml. of 1 N-hydrochloric acid, with stirring. The resulting mixture is then allowed to stand at a reduced temperature (i.e., about 10° C.) until a precipitate coagulates. The precipitate is filtered off, washed with 1 percent aqueous pyridine, then with water and dried. The resulting off-white powder is a mixture of the 5β,19-cyclo-androsta-1,7-dien-3β,17α- and 3β,17β-diols. This mixture is then stirred in 15 ml. of benzene containing 35 mg. of p-toluenesulfonic acid for 20 minutes. The solution is then diluted with benzene, washed with 5 percent aqueous sodium bicarbonate, then with water, and then dried and evaporated. The residue is then purified on silica plates, developed in 1:1 ether:hexane. The resulting 3-desoxy product is a mixture of 5β,19-cyclo-5,10-seco-androsta-1(10),2,4,7-tetraen-17β-ol and the 17α-epimer. The 17α-epimer is separated by chromatography over silica gel.

The 17β-alcohol product is then converted into the corresponding 17β-acetate by mixing 68 mg. of the above 17β-alcohol in 3 ml. of pyridine containing 10 mg. of acetic anhydride and allowing the mixture to stand overnight. The resulting product is 5β,19-cyclo-5,10-seco-androsta-1(10),2,4,7-tetraen 17-acetate.

By following the above procedure using 5β,19-cyclo-androsta-1,6-diene-3,17-dione as the initial starting material, the following 3-desoxy compounds are prepared:

5β,19-cyclo-5,10-seco-androsta-1(10),2,4,6-tetraene-17β-ol;

5β,19-cyclo-5,10-seco-androsta-1(10),2,4,6-tetraene-17α-ol;

5β,19-cyclo-5,10-seco-androsta-1(10),2,4,6-tetraene-17β-ol-17-acetate.

EXAMPLE 6

This example illustrates a method according to our invention of converting 17-keto compounds of our invention to the corresponding 17α-alkyne-17β-hydroxy. To a stirred solution of 2 g. of 3-methoxy-5β,19-cyclo-5,10-seco-androsta-1(10),2,4,7-tetraen-17-one in 250 ml. of absolute ether is added, in a dropwise fashion under nitrogen, an ethereal solution of 10 molar equivalents of lithium acetylide. The mixture is then stirred for 48 hours at room temperature, poured into water, acidified with hydrochloric acid and stirred vigorously for 1 hour. The ethereal phase is separated, washed with water to neutrality, dried over sodium sulfate and evaporated to dryness to yield 3-methoxy-17α-ethynyl-5β,19-cyclo-5,10-seco-androsta-1(10),2,4,7-tetraene which is further purified by recrystallization from acetone:hexane. By using the -1(10),2,4,6-tetraene counterpart as the starting material, 3-methoxy-17α-ethynyl-5β,19-cyclo-5,10-seco-androsta-1(10),2,4,6-tetraene is prepared.

By following the above procedure, using the corresponding 17-keto starting materials of Formula II, the following -1(10),2,4,7-tetraene compounds and their corresponding -1(10),2,4,6-tetraene counterparts are prepared:

17α-ethynyl-17β-hydroxy-5β,19-cyclo-5,10-seco-androsta-1(10),2,4,7-tetraene;

17α-ethynyl-17β-hydroxy-3-propoxy-5β,19-cyclo-5,10-seco-androsta-1(10),2,4,7-tetraene;

3-ethoxy-17α-ethynyl-17β-hydroxy-5β,19-cyclo-5,10-seco-androsta-1(10),2,4,7-tetraene.

By using the same 17-keto starting materials as used above but using lithium methylacetylide in place of lithium acetylide, the following -1(10),2,4,7 compounds and their 1(10),2,4,6-tetraene counterparts are prepared;

17β-hydroxy-17α-propynyl-5β,19-cyclo-5,10-seco-androsta-1(10),2,4,7-tetraene;

17β-hydroxy-3-propoxy-17α-propynyl-5β,19-cyclo-5,10-seco-androsta-1(10),2,4,7-tetraene;

17β-hydroxy-3-ethoxy-17α-propynyl-5β,19-cyclo-5,10-seco-androsta-1(10),2,4,7-tetraene.

By following the same procedures as set forth above, in this example, but by using the corresponding compounds of 17-keto- Formula I as starting materials in place of the compounds of Formula II used above, the following -1,7-diene compounds and their -1,6-diene counterparts are prepared:

17α-ethynyl-17β-hydroxy-5β,19-cyclo-androsta-1,7-dien-3-one;

17β-hydroxy-17α-propynyl -5β,19-cyclo-androsta-3-one.

EXAMPLE 7

In this example, 5 g. of 3-methoxy-5β,19-cyclo-5,10-seco-androsta-1(10),2,4,7-tetraen-17-one in 250 ml. of thiophene-free benzene is treated with an equal molar amount of acetylene magnesium bromide in an anhydrous ether. The mixture is heated at reflux under anhydrous conditions for 3 hours, cooled, and cautiously treated with excess aqueous ammonium chloride solution. The mixture is then extracted with ethyl acetate and the extracts washed with water, dried over sodium sulfate and evaporated to dryness affording 3-methoxy-17α-ethynyl-17β-hydroxy-5β,19-cyclo-5,10-seco-androsta-1(10),2,4,7-tetraene. The product is then further purified by recrystallization from methylene chloride:hexane solvent. By using the −1(10),2,4,6-tetraene counterpart as the starting material, 3-methoxy-17α-ethynyl-17β-hydroxy-5β,19-cyclo-5,10-seco-androsta-1(10),2,4,6-tetraene is prepared.

By following the same procedure as set forth above, but using the corresponding 17-keto starting materials, the following −1(10),2,4,7-tetraene steroids and their −1(10),2,4,6-tetraene counterparts are prepared:

17α-ethynyl-17β-hydroxy-5β,19-cyclo-5,10-seco-androsta-1(10),2,4,7-tetraene;

17α-ethynyl-17β-hydroxy-3-propoxy-5β,19-cyclo-5,10-seco-androsta-1(10),2,4,7-tetraene;

17α-ethynyl-17β-hydroxy-3-ethoxy-5β,19-cyclo-5,10-seco-androsta-1(10),2,4,7-tetraene.

By following the same procedure as set forth above but using propynyl magnesium bromide in place of acetylene magnesium bromide, the following -1(10),2,4,7-tetraene steroids and their -1(10),2,4,6-tetraene counterparts are prepared:

17β-hydroxy-17α-propynyl-5β,19-cyclo-5,10-seco-androsta-1(10),2,4,7-tetraene;

17β-hydroxy-3-methoxy-17α-propynyl-5β,19-cyclo-5,10-seco-androsta-1(10),2,4,7-tetraene;

3-ethoxy-17β-hydroxy-17α-propynyl-5β,19-cyclo-5,10-seco-androsta-1(10),2,4,7-tetraene.

By following the same procedure as set forth above but by using ethylene magnesium bromide in place of acetylene magnesium bromide, the following compounds are prepared:

3-methoxy-17β-hydroxy-17α-vinyl-5β,19-cyclo-5,10-seco-androsta-1(10),2,4,7-tetraene and -1(10),2,4,6-tetraene;

17β-hydroxy-17α-vinyl-5β,19-cyclo-5,10-seco-androsta-1(10),2,4,7-tetraene and -1(10),2,4,6-tetraene;

3-ethoxy-17β-hydroxy-17α-vinyl-5β,19-cyclo-5,10-seco-androsta-1(10),2,4,7-tetraene and -1(10),2,4,6-tetraene.

By following the same procedure as set forth above but by using cyclopropylmagnesium bromide in place of acetylene magnesium bromide, the following -1(10),2,4,7-tetraene steroids and their -1(10),2,4,6-tetraene counterparts are prepared:

3-methoxy-17α-cyclopropyl-17β-hydroxy-5β,19-cyclo-5,10-seco-androsta-1(10),2,4,7-tetraene;

3-propoxy-17α-cyclopropyl-17β-hydroxy-5β,19-cyclo-5,10-seco-androsta-1(10),2,4,7-tetraene;

17α-cyclopropyl-17β-hydroxy-5β,19-cyclo-5,10-seco-androsta-1(10),2,4,7-tetraene; and 3-ethoxy-17α-cyclopropyl-17β-hydroxy-5β,19-cyclo-5,10-seco-androsta-1(10),2,4,7-tetraene.

EXAMPLE 7(a)

This example illustrates a preferred method of preparing the 3-acyloxy-17α-alkyne; -17α-alkenyl; and -17α-cyclopropyl compounds of Formula II of our invention. In this example 100 mg. of 17α-ethynyl-17β-hydroxy-3-methoxy-5β,19cyclo-androsta-1(10),7-diene in 10 ml. of aqueous acetone is added to 2 ml. of water containing 1 mg. of p-toluenesulfonic acid. The mixture is heated at reflux for one hour then cooled, diluted with water and extracted with ethyl acetate. The extract is washed with aqueous 1 percent sodium bicarbonate solution and water until neutral, then dried and evaporated affording a product residue of 17α-ethynyl -17β-hydroxy-5β,19-cyclo-androsta-1,7-dien-3-one.

By following the above procedure using the respective 17β-hydroxy-3-methoxy-5β,19-cyclo-androsta-17α-alkyne; -17α-alkenyl; and -17α-cyclopropyl starting materials, the following compounds are prepared:

17α-ethynyl-17β-hydroxy-5β,19-cyclo-androsta-1,6-dien-3-one;

17β-hydroxy-17α-vinyl-5β,19-cyclo-androsta-1,7-dien-3-one;

17β-hydroxy-17α-vinyl-5α-vinyl-5β,19-cyclo-androsta-1,6-dien-3-one;

17β-hydroxy-17α-cyclopropyl-5β,19-cyclo-androsta-1,7-dien-3-one;

17β-hydroxy-17α-cyclopropyl-5β,19-cyclo-androsta-1,6-dien-3-one.

The above compounds are, respectively, treated with a mixture of p-toluenesulfonic acid and acetic anhydride according to the procedure of Example 3, to respectively provide the following compounds:

3-acetoxy-17α-ethynyl-17β-hydroxy-5β,19-cyclo-5,10-seco-androsta-1(10),2,4,7-tetraene;

3-acetoxy-17α-ethynyl-17β-hydroxy-5β,19-cyclo-5,10-seco-androsta-1(10),2,4,6-tetraene;

3-acetoxy-17β-hydroxy-17α-vinyl-5β,19-cyclo-5,10-seco-androsta-1(10),2,4,7-tetraene;

3-acetoxy-17β-hydroxy-17α-vinyl-5β,19-cyclo-5,10-seco-androsta-1(10),2,4,6-tetraene;

3-acetoxy-17β-hydroxy-17α-cyclopropyl-5β,19-cyclo-5,10-seco-androsta-1(10),2,4,7-tetraene;

3-acetoxy-17β-hydroxy-17α-cyclopropyl-5β,19-cyclo-5,10-seco-androsta-1(10),2,4,6-tetraene.

By using propionic anhydride in place of acetic anhydride, the corresponding 3-propionyloxy compounds are prepared.

EXAMPLE 8

This example illustrates a method of preparing the 17α-haloethynyl compounds of Formulas I and II. In this example, a solution of 8.5 g. of 1,1,2-dichloroethylene in 50 ml. of anhydrous ether is added in a dropwise fashion, under nitrogen at 0° C., over a 30 minute period to a stirred solution of 15 ml. of 1.4 N-methyl lithium in anhydrous ether. After stirring for an additional 90 minutes at room temperature, a solution of 0.5 g. of 3-methoxy-5β,19-cyclo-5,10-seco-androsta-1(10),2,4,7-tetraen-17-one in 20 ml. of anhydrous ether is added in dropwise fashion with stirring over a 15 minute period. The mixture is stirred at room temperature for 18 hours and then poured into ice water and extracted with ether. The extracts are washed with water, dried over sodium sulfate and evaporated under reduced pressure. The resulting residue is chromatographed on alkali alumina, eluting with a 8:1 mixture of hexane and ether affords 3-methoxy-17α-chloroethynyl-17β-hydroxy-5β,19-cyclo-5,10-seco-androsta-1(10),2,4,7-tetraene which is then further purified by recrystallization from methanol.

By following the above procedure, but using the respective corresponding 17-keto compound of Formulas I and II, the following compounds are prepared:

17α-chloroethynyl-17β-hydroxy-3-propoxy-5β,19-cyclo-5,10-seco-androsta-1(10),2,4,7-tetraene;

17α-chloroethynyl-17β-hydroxy-3-propoxy-5β,19-cyclo-5,10-seco-androsta-1(10),2,4,6-tetraene;

17α-chloroethynyl-17β-hydroxy-5β,19-cyclo-5,10-seco-androsta-1(10),2,4,7-tetraene;

17α-chloroethynyl-17β-hydroxy-5β,19-cyclo-5,10-seco-androsta-1(10),2,4,6-tetraene;

17α-chloroethynyl-17β-hydroxy-3-ethoxy-5β,19-cyclo-5,10-seco-androsta-1(10),2,4,7-tetraene;

17α-chloroethynyl-17β-hydroxy-3-ethoxy-5β,19-cyclo-5,10-seco-androsta-1(10),2,4,6-tetraene;

17α-chloroethynyl-17β-hydroxy-5β,19-cyclo-androsta-1,7-diene-3-one.

By following the procedure of Example 7(a) using the 3-methoxy-17α-chloroethynyl-17β-hydroxy compounds of Formula II as starting materials, the corresponding 3-acetoxy and 3-propionyloxy forms of the above compounds are prepared.

EXAMPLE 9

This example illustrates a method of preparing the 17α-dihalocyclopropenyl compounds of Formulas I and II. In this example, 18 millimolar equivalents of sodium dichlorofluoro acetate in 40 ml. of anhydrous diglyme is added to a refluxing solution of 1 millimole of 17α-ethynyl-17β-hydroxy-3-methoxy-5β,19-cyclo-5,10-seco-androsta-1(10),2,4,7-tetraene in 50 ml. of anhydrous diglyme with constant stirring. Following completion of the addition, the mixture is refluxed for an additional 30 minutes. The reaction mixture is then cooled, filtered, and the resulting filtrate is evaporated to dryness under reduced pressure. The resulting residue is then chromatographed on Florosil adsorbent (synthetic magnesium silicate) eluting with ether to afford 17α-(2',2'-difluoro-cyclopropenyl)-3-methoxy-5β,19-cyclo-5,10-seco-androsta-1(10),2,4,7-tetraene.

By following the same procedure set forth above but using the respective corresponding 17α-ethynyl compounds of Formulas I and II, the following compounds are prepared:

17α-(2',2'-difluorocyclopropenyl)-3-methoxy-17β-hydroxy-5β,19-cyclo-5,10-seco-androsta-1(10),2,4,6-tetraene;

17α-(2',2'-difluorocyclopropenyl)-3-ethoxy-17β-hydroxy-5β,19-cyclo-5,10-seco-androsta-1(10),2,4,7-tetraene;

17α-(2',2'-difluorocyclopropenyl)-17β-hydroxy-5β,19-cyclo-5,10-seco-androsta-1(10),2,4,7-tetraene;

17α-(2',2'-difluorocyclopropenyl)-17β-hydroxy-5β,19-cyclo-5,10-seco-androsta-1(10),2,4,6-tetraene;

17α-(2',2'-difluorocyclopropenyl)-3-propoxy-5β,19-cyclo-5,10-seco-androsta-1(10),2,4,7-tetraene;

17α-(2',2'-difluorocyclopropenyl)-3-propoxy-5β,19-cyclo-5,10-seco-androsta-1(10),2,4,6-tetraene;

17α-(2',2'-difluorocyclopropenyl)-17β-hydroxy-5β,19-cyclo-androsta-1,7-dien-3-one.

By following the same procedure set forth above, using the same 17α-ethynyl compounds of starting material but using sodium trichloro acetate in place of sodium trichlorodifluoro acetate, the corresponding 17α-(2',2'-dichlorocyclopropenyl) compounds of Formulas I and II are prepared.

By the following the above procedure, but using the respective corresponding 3-acetoxy and 3-propionyloxy forms of the 17α-ethynyl compounds of Formulas I and II as starting materials, the corresponding 3-acetoxy and 3-propionyloxy forms of the above compounds are prepared.

EXAMPLE 10

This example illustrates a method according to our invention of preparing the 17α-dihalocyclopropyl compounds of Formulas I and II of our invention. In this example, a solution of 35 millimoles of sodium trichloro acetate in 40 ml. of diglyme is added over a 2 hour period in a dropwise fashion to a refluxing solution of 1 millimole of 17β-hydroxy-3-methoxy-17α-vinyl-5β,19-cyclo-5,10-seco-androsta-1(10),2,4,7-tetraene in 10 ml. of diglyme with constant stirring. After addition of the sodium trichloro acetate solution, the mixture is refluxed for an additional hour and then filtered. The filtrate is evaporated to dryness and the residue is chromatographed on alumina, eluting with benzene and benzene-ether mixture to afford 17α-(2',2'-dichlorocyclopropyl)-3-methoxy-17β-hydroxy-5β,19-cyclo-5,10-seco-androsta-1(10),2,4,7-tetraene.

By following the same procedure as set forth above, but by using the corresponding 17α-vinyl compounds of Formulas I and II, the following compounds are prepared:

17α-(2',2'-dichlorocyclopropyl)-3-methoxy-17β-hydroxy-5β,19-cyclo-5,10-seco-androsta-1(10),2,4,6-tetraene;

17α-(2',2'-dichlorocyclopropyl)-3-ethoxy-17β-hydroxy-5β,19-cyclo-5,10-seco-androsta-1(10),2,4,7-tetraene;

17α-(2',2'-dichlorocyclopropyl)-3-ethoxy-17β-hydroxy-5β,19-cyclo-5,10-seco-androsta-1(10),2,4,6-tetraene;

3-acetoxy-17α-(2',2'-dichlorocyclopropyl)-17β-hydroxy-5β,19-cyclo-5,10-seco-androsta-1(10),2,4,7-tetraene;

3-acetoxy-17α-(2',2'-dichlorocyclopropyl)-17β-hydroxy-5β,19-cyclo-5,10-seco-androsta-1(10),2,4,6-tetraene;

17α-(2',2'-dichlorocyclopropyl)-17β-hydroxy-3-propionyloxy-5β,19-cyclo-5,10-seco-androsta-1(10),2,4,7-tetraene;

17α-(2',2'-dichlorocyclopropyl)-17β-hydroxy-3-propionyloxy-5β,19-cyclo-5,10-seco-androsta-1(10),2,4,6-tetraene;

17α-(2',2'-dichlorocyclopropyl)-17β-hydroxy-5β,19-cyclo-androsta-1,7-dien-3-one.

By following the same procedure as set forth above using the same 17α-vinyl starting materials but using sodium chlorodifluoroacetate in place of sodium trichloroacetate, the corresponding 17α-(2',2'-difluorocyclopropyl) compounds of Formulas I and II are prepared.

By following the procedure of Example 7(a), but using the respective corresponding 17α-(2',2'-difluorocyclopropyl)-3-methoxy and 17α-(2',2'-difluorocyclopropyl)-3-methoxy compounds of Formula II, the corresponding 3-acetoxy and 3-propionyloxy forms of the above compounds are prepared.

EXAMPLE 11

This example illustrates a method of preparing the 17α-propadiene compounds of Formulas I and II. In this example 1.3 g. of magnesium shavings and 25 ml. of anhydrous tetrahydrofuran are heated under reflux with a solution of 1 g. of 3-methoxy-17α-(2',2'-dichlorocyclopropyl)-17β-hydroxy-5β,19-cyclo-5,10-seco-androsta-1(10),2,4,7-tetraene for 24 hours. The mixture is cautiously hydrolyzed by dropwise addition of water, followed by the addition of aqueous 10 percent (wt.) hydrochloric acid. The ether layer is separated, dried and evaporated affording 17β-hydroxy-3-methoxy-17α-propadienyl-5β,19-cyclo-5,10-seco-androsta-1(10),2,4,7-tetraene.

By following the same procedure but using the corresponding 17α-(2',2'-dichlorocyclopropyl) compound of Formulas I and II, the following compounds are prepared:

3-ethoxy-17β-hydroxy-17α-propadienyl-5β,19-cyclo-5,10-seco-androsta-1(10),2,4,7-tetraene;

3-acetoxy-17β-hydroxy-17α-propadienyl-5β,19-cyclo-5,10-seco-androsta-1(10),2,4,7-tetraene;

17β-hydroxy-17α-propadienyl-3-propionyloxy-5β,19-cyclo-5,10-seco-androsta-1(10),2,4,7-tetraene;

17β-hydroxy-17α-propadienyl-5β,19-cyclo-androsta-1,7-dien-3-one.

The above compounds are also prepared from the corresponding 17α-dichlorocyclopropyl compounds by following the same procedure.

EXAMPLE 12

This example illustrates a method according to our invention of preparing compounds of Formula (A). In this example, 137.7 mg. of 3-acyloxy-5β,19-cyclo-5,10-seco-androsta-1(10),2,4,7-tetraen-17-one; 89.2 mg. of N-bromosuccinimide and 50.2 mg. of lithium carbonate are admixed together in 15 ml. of carbon tetrachloride and heated at reflux. Reaction is initiated by irradiation from a 200 watt incandescent tungsten filament lamp. Once the reaction is initiated, the irradiation is discontinued. After 45 minutes, the solution is cooled and then washed twice with water, dried and evaporated. The residue is then purified by chromatography over silica, and then further purified using silica plates, impregnated with silver nitrate. The product fraction is treated in benzene solution with activated charcoal, and the solvent then evaporated. The resulting product crystals are then further purified by recrystallization from methanol. The resulting product is identified as 3-acetoxy-5β,19-cyclo-5,10-seco-androsta-1(10)2,4,6,8-pentaen-17-one.

By following the above procedure using both the -1(10),2,4,7-tetraene and -1(10),2,4,6-tetraene products of Examples 3,4 and 7-11 as starting materials, the following compounds are prepared:

3-acetoxy-5β,19-cyclo-5,10-seco-androsta-1(10),2,4,6,8-pentaen-17β-ol 17-propionate;

3-acetoxy-5β,19-cyclo-5,10-seco-androsta-1(10),2,4,6,8-pentaen-17β-ol tetrahydropyran-2'-yl ether;

3,17β-diacetoxy-17α-methyl-5β,19-cyclo-5,10-seco-androsta-1(10),2,4,6,8-pentaene;

3-acetoxy-18-methyl-5β,19-cyclo-5,10-seco-androsta-1(10),2,4,6,8-pentaen-17-one;

3-methoxy-5β,19-cyclo-5,10-seco-androsta-1(10),2,4,6,8-pentaen-17-one;

3-methoxy-17β-hydroxy-5β,19-cyclo-5,10-seco-androsta-1(10),2,4,6,8-pentaene 17-propionate;

3-methoxy-17β-hydroxy-5β,19-cyclo-5,10-seco-androsta-1(10),2,4,6,8-pentaene 17-valerate;

3-methoxy-17β-hydroxy-5β,19-cyclo-5,10-seco-androsta-1(10),2,4,6,8-pentaene 17-acetate;

3-methoxy-17β-hydroxy-17α-methyl-5β,19-cyclo-5,10-seco-androsta-1(10),2,4,6,8pentaene;

3-methoxy-18-methyl-5β,19-cyclo-5,10seco-androsta-1(10),2,4,6,8-pentaene 17-dimethyl ketal;

3-acetoxy-17α-ethynyl-17β-hydroxy-5β,19-cyclo-5,10-seco-androsta-1(10),2,4,6,8-pentaene;

17α-ethynyl-17β-hydroxy-3-propionyloxy-5β,19-cyclo-5,10-seco-androsta-1(10),2,4,6,8-pentaene;

17α-ethynyl-17β-hydroxy-3-methoxy-5β,19-cyclo-5,10-seco-androsta-1(10),2,4,6,8-pentaene;

17α-ethynyl-17β-hydroxy-3-ethoxy-5β,19-cyclo-5,10-seco-androsta-1(10),2,4,6,8-pentaene;

17β-hydroxy-17α-propynyl-3-propionyloxy-5β,19-cyclo-5,10-seco-androsta-1(10),2,4,6,8-pentaene;

17β-hydroxy-3-methoxy-17α-propynyl-5β,19-cyclo-5,10-seco-androsta-1(10),2,4,6,8-pentaene;

3-ethoxy-17β-hydroxy-17α-propynyl-5β,19-cyclo-5,10-seco-androsta-1(10),2,4,6,8-pentaene;

3β-acetoxy-17β-hydroxy-17α-vinyl-5β,19-cyclo-5,10-seco-androsta-1(10),2,4,6,8-pentaene;

17β-hydroxy-3-methoxy-17α-vinyl-5β,19-cyclo-5,10-seco-androsta-1(10),2,4,6,8-pentaene;

3-ethoxy-17β-hydroxy-17α-vinyl-5β,19-cyclo-5,10-seco-androsta-1(10),2,4,6,8-pentaene;

3-acetoxy-17α-cyclopropyl-17β-hydroxy-5β,19-cyclo-5,10-seco-androsta-1(10),2,4,6,8-pentaene;

3-propionyloxy-17α-cyclopropyl-17β-hydroxy-5β,19-cyclo-5,10-seco-androsta-1(10),2,4,6,8-pentaene;

3-methoxy-17α-cyclopropyl-17β-hydroxy-5β,19-cyclo-5,10-seco-androsta-1(10),2,4,6,8-pentaene;

3-ethoxy-17α-cyclopropyl-17β-hydroxy-5β,19-cyclo-5,10-seco-androsta-1(10),2,4,6,8-pentaene;

17β-hydroxy-17α-propynyl-5β,19-cyclo-androsta-1,7-dien-3-one;

17β-hydroxy-17α-propynyl-5β,19-cyclo-androsta-1,7-dien-3-one;

17β-hydroxy-17α-vinyl-5β,19-cyclo-androsta-1,7-dien-3-one;

17β-hydroxy-17α-cyclopropyl-5β,19-cyclo-androsta-1,7-dien-3one;

3acetoxy-17α-chloroethynyl-17β-hydroxy-5β,19-cyclo-5,10-seco-androsta-1(10),2,4,6,8-pentaene;

17α-chloroethynyl-17β-hydroxy-3-propionyloxy-5β,19-cyclo-5,10-seco-androsta-1(10),2,4,6,8-pentaene;

17α-chloroethynyl-17β-hydroxy-3-methoxy-5β,19-cyclo-5,10 -seco-androsta-1(10),2,4,6,8-pentaene;

17α-chloroethynyl-17β-hydroxy-3-ethoxy-5β,19-cyclo-5,10-seco-androsta-1(10),2,4,6,8-pentaene;

17α-(2',2'-difluorocyclopropenyl)-3-methoxy-5β,19-cyclo-5,10-seco-androsta-1(10),2,4,6,8-pentaene;

17α-(2',2'-difluorocyclopropenyl)-3-ethoxy-17α-hydroxy-5β,19-cyclo-5,10-seco-androsta-1(10),2,4,6,8-pentaene;

17α-(2',2'-difluorocyclopropenyl)-3-acetoxy-3-ethoxy-17β-hydroxy-5β,19-cyclo-5,10-seco-androsta-1(10),2,4,6,8-pentaene;

17β-(2',2'-difluorocyclopropenyl)-3-propionyloxy-5β,19-cyclo-5,10-seco-androsta-1(10),2,4,6,8-pentaene;

17α-(2',2'-dichlorocyclopropyl)-3-ethoxy-17β-hydroxy-5β,19-cyclo-5,10-seco-androsta-1(10),2,4,6,8-pentaene;

3-acetoxy-17α-(2',2'-dichlorocyclopropyl)-17β-hydroxy-5β,19-cyclo-5,10-seco-androsta-1(10),2,4,6,8-pentaene;

17α-(2',2'-dichlorocyclopropyl)-17β-hydroxy-3-propionyloxy-5β,19-cyclo-5,10 -seco-androsta-1(10),2,4,6,8-pentaene;

17α-(2',2'-difluorocyclopropyl)-3-ethoxy-17β-hydroxy-5β,19-cyclo-5,10-seco-androsta-1(10),2,4,6,8-pentaene;

3-acetoxy-17α-(2',2'-difluorocyclopropyl)-17β-hydroxy-5β,19-cyclo-5,10-seco-androsta-1(10),2,4,6,8-pentaene;

17α-(2',2'-difluorocyclopropyl)-17β-hydroxy-3-propionyloxy-5β,19-cyclo-5,10-seco-androsta-1(10),2,4,6,8-pentaene;

17β-hydroxy-3-methoxy-17α-propadienyl-5β,19-cyclo-5,10seco-androsta-1(10),2,4,6,8-pentaene;

3-ethoxy-17β-hydroxy-17α-propadienyl-5β,19-cyclo-5,10-seco-androsta-1(10),2,4,6,8-pentaene;

3-acetoxy-17β-hydroxy-17α-propadienyl-5β,19-cyclo-5,10-seco-androsta-1(10),2,4,6,8-pentaene;

17β-hydroxy-17α-propadienyl-3-propionyloxy-5β,19-cyclo-5,10-seco-androsta-1(10),2,4,6,8-pentaene.

Unless expressly stated to the contrary, temperatures, as used herein above and in the claims, refer to °C.

Obviously many modifications and variations of the invention, described hereinabove and in the claims, can be made without departing from the essence and scope thereof.

What is claimed is:

1. A compound selected from the group of compounds having the formulas:

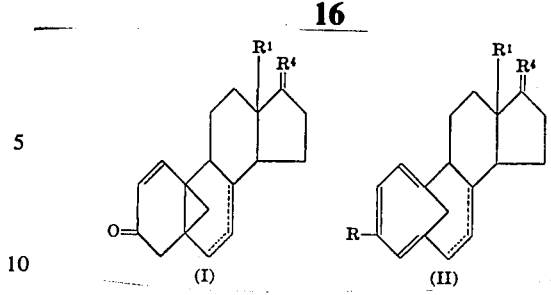

wherein R is selected from the group consisting of H, lower alkoxy, and carboxylic acyloxy; R¹ is methyl or ethyl; R⁴ is oxo or the group $$\overset{R^2}{\underset{\cdots R^3}{|}}$$

wherein R² is selected from the group consisting of hydroxy, hydrolyzable carboxylic esters, tetrahydropyran-2'-yloxy, and tetrahydrofuran-2'-yloxy; and R³ is selected from the group consisting of H, lower alkyl, lower alkenyl, lower alkynyl, lower haloalkynyl, cyclopropyl, dichlorocyclopropyl, difluorocyclopropyl, propadienyl, dichlorocyclopropynyl, difluorocyclopropynyl, lower alkoxy and carboxylic acyloxy; and wherein the bond line  indicates a double bond at the 6(7) position or at the 7(8) position.

2. The compound of claim 1 wherein said compound has the formula

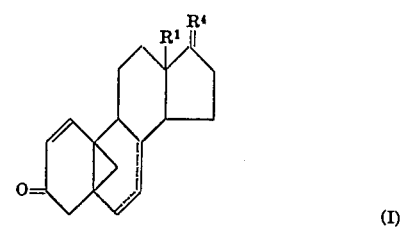

wherein R¹, R⁴, and  have the same meaning as set forth in claim 1.

3. The compound of claim 2 wherein R¹ is methyl and R⁴ is selected from the group consisting of oxo and the group $$\overset{R^2}{\underset{\cdots R^3}{|}}$$

wherein R³ is selected from the group consisting of hydroxy and acetoxy.

4. The compound of claim 1 wherein said compound has the formula

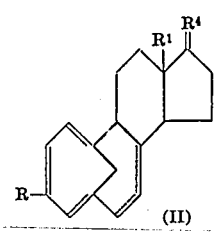

wherein R, R¹, R⁴, and  have the same meaning as set forth in claim 1.

5. The compound of claim 4 wherein R is selected from the group consisting of H, acetoxy, and methoxy; R¹ is methyl; and R⁴ is selected from the group consisting of oxo and the group $$\overset{R^2}{\underset{\cdots R^3}{|}}$$

wherein R³ is selected from the group consisting of hydroxy and ethynyl.

6. A process for preparing the compounds of claim 2 which comprises treating a compound of the formula:

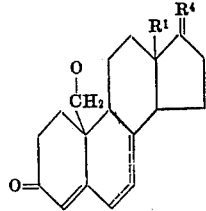

wherein R¹, ⌐ and R⁴ have the same meaning as defined in claim 2; with a 2-chloro-1,1,2-trifluoroalkyl dialkylamine under reactive conditions whereby the steroid of claim 2 are formed.

7. The process of claim 6 wherein said treatment is conducted at temperatures in the range of about from 20° C. to reflux for about from one-half to 5 hours and wherein said dialkylamine is selected from the group consisting of 2-chloro-1,1,2-trifluoroethyl diethylamine; 2-chloro-1,1,2-trifluoroethyl diisopropylamine and 2-chloro-1,1,2-trifluoroethyl dimethylamine.

8. A process for preparing the –4,7-diene compounds of claim 2 which comprises the steps of:
   a. treating a 19-hydroxy-androsta-4,6-dien-3-one steroid with a mixture of an alkali metal alkoxide and a dialkyl sulfoxide, under reactive conditions whereby a 19-hydroxy-androsta-4,7-diene steroid is formed; and
   b. treating said 19-hydroxy-androsta-4,7-diene steroid with a 2-chloro-1,1,2-trifluoroalkyl dialkylamine under reactive conditions whereby a 5,19-cycloandrosta-1,7-dien-3-one steroid of claim 2 is formed.

9. The process of claim 8 wherein said treatment of step (b) is conducted at temperatures in the range of about from 20° C. to reflux for about from one-half to 5 hours and wherein said dialkylamine is selected from the group consisting of 2-chloro-1,1,2-trifluoroethyl diethylamine; 2-chloro-1,1,2-trifluoroethyl diisopropylamine and 2-chloro-1,1,2-trifluoroethyl dimethylamine.

10. A process for preparing the compounds of claim 4 which comprises treating a steroid compound of the formula:

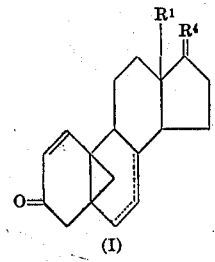

wherein R¹, R⁴, and ⌐ have the same meaning as defined in claim 4 with a compound selected from the group consisting of trialkoxy orthoformates and carboxylic acid anhydrides, in the presence of an acid catalyst under reactive conditions whereby the respective 3-alkoxy- or 3-carboxylic acyloxy-compounds of claim 4 are formed.

11. The process of claim 10 wherein said steroid compound is treated with a trialkoxy orthoformate whereby the 3-alkoxy steroid compounds of claim 4 are obtained.

12. The process of claim 11 wherein said treatment is conducted at temperatures in the range of about from 20° to 75° C. for about from one-half to 24 hours and wherein said trialkoxy orthoformate is selected from the group consisting of trimethyloxy orthoformate, triethyloxy orthoformate, and triisopropyl orthoformate, and said acid catalyst is selected from the group consisting of p-toluenesulfonic acid, dinitrobenzene sulfonic acid, benzene sulfonic acid and sulfosalicylic acid.

13. The process of claim 10 wherein said steroid compound is treated with a carboxylic acid anhydride whereby the 3-carboxylic acetoxy compounds of claim 4 are obtained.

14. The process of claim 13 wherein said treatment is conducted at temperatures in the range of about from 20° to 75° C. for about from one-half to 24 hours and wherein said carboxylic acid anhydride is selected from the group consisting of acetic anhydride, propionic anhydride, butyric anhydride, and benzoic anhydride and said acid catalyst is selected from the group consisting of p-toluenesulfonic acid, dinitrobenzene sulfonic acid, benzene sulfonic acid and sulfosalicylic acid.

15. A process for preparing the 3-desoxy (R is H) compounds of claim 4 which comprises the steps of:
   a. treating a steroid compound having the formula:

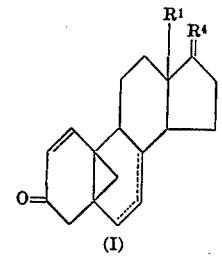

wherein R¹, R⁴, and ⌐ have the same meaning as defined in claim 4 with aluminum alkoxide in an inert organic solvent under reactive conditions whereby a corresponding 3-hydroxy steroid is formed; and
   b. treating said 3-hydroxy steroid with an acylsulfonic acid under reactive conditions whereby the 3-desoxy compounds of claim 4 is obtained.

16. The process of claim 15 wherein said aluminum alkoxide is aluminum isopropoxide.

17. The process of claim 16 wherein step (a) is conducted at about the reflux temperature and wherein step (b) is conducted in an inert liquid organic media at temperatures in the range of about from 15° to 75° C. and wherein said acylsulfonic acid is p-toluenesulfonic acid.

18. A process for preparing the 3-carboxylic-acyloxy compounds of claim 4 wherein R is carboxylic acyloxy; and R⁴ is the group

wherein R² is OH and R³ is selected from the group consisting of lower alkenyl, lower alkynyl, lower haloalkynyl, cyclopropyl, dichlorocyclopropyl, difluorocyclopropyl, dichlorocyclopropynyl, difluorocyclopropynyl and propadienyl, which comprises the steps of:
   a. treating a compound of claim 4 wherein R is a lower alkoxy, R⁴ is the group

wherein R² is OH and wherein R³ corresponds to the R³ group of said 3-carboxylic acyloxy compound of claim 4, with an acylsulfonic acid selected from the group consisting of p-toluenesulfonic acid, dinitrobenzene sulfonic acid, benzene sulfonic acid and sulfosalicylic acid, in an aqueous inert organic solvent at temperatures in the range of about from 75° C. to reflux for about from one-half to 24 hours whereby a corresponding 17β-hydroxy-5β,19-cyclo-androsta-dien-3-one steroid having the corresponding R³ (17α) group and –1,7-diene or –1,6-diene unsaturation is formed; and
   b. treating said 5β,19-cyclo-androsta steroid with a carboxylic acid anhydride in the presence of an acylsulfonic acid under reactive conditions whereby said 3-carboxylic acyloxy compound of claim 4 is obtained.

19. The process of claim 18 wherein the treatment of step (b) is conducted at temperatures in the range of about from 20° to 75° C. for about from one-half to 24 hours and wherein said carboxylic acid anhydride is selected from the group consisting of acetic anhydride, propionic anhydride, butyric anhydride, and benzoic anhydride and said acylsulfonic acid is selected from the group consisting of p-toluenesulfonic acid, dinitrobenzene sulfonic acid, benzene sulfonic acid and sulfosalicylic acid.

20. A process for preparing annulene compounds of the formula

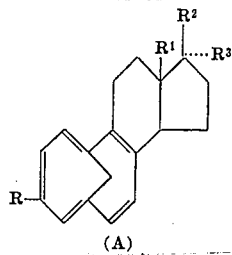

(A)

wherein RR¹ and R⁴ have the same meaning as defined in claim 4; which comprises treating the compound of claim 4 with a mixture of a N-haloimide and an alkali metal carbonate under reactive conditions whereby said annulene compound is obtained.

21. The process of claim 20 wherein said haloimide is selected from the group consisting of N-bromosuccinimide, N-bromoacetamide, and N,N-dibromo dimethylhydantoin and wherein said treatment is conducted at temperatures in the range of about from 20° C. to reflux for about from one-half to 2 hours in an inert liquid organic media.

22. A process for preparing annulene compounds of the formula:

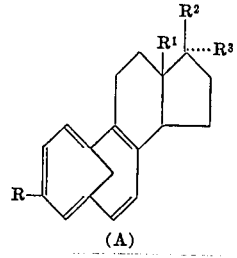

(A)

wherein R is selected from the group consisting of H, lower alkoxy, and carboxylic acyloxy; R¹ is methyl or ethyl; R⁴ is oxo or the group

wherein R² is selected from the group consisting of hydroxy, hydrolyzable carboxylic esters, tetrahydropyran-2'-yloxy, and tetrahydrofuran-2'-yloxy; and R³ is selected from the group consisting of H, lower alkyl, lower alkenyl, lower alkynyl, lower haloalkynyl, cyclopropyl, dichlorocyclopropyl, difluorocyclopropyl, propadienyl, dichlorocyclopropynyl, difluorocyclopropynyl, lower alkoxy and carboxylic acyloxy; which comprises the steps of:

a. treating a 19-hydroxy-androsta-4,6-dien-3-one steroid with a mixture of an alkali metal alkoxide and a dialkyl sulfoxide, under reactive conditions thereby forming a 19-hydroxy-androsta-4,7-dien-3-one steroid;

b. treating said 19-hydroxy-androsta-4,7-dien-3-one steroid with a 2-chloro-1,1,2-trifluoroalkyl dialkylamine under reactive conditions thereby forming a 5,19-cycloandrosta-1,7-dien-3-one steroid;

c. treating said 5,19-cycloandrosta-1,7-dien-3-one steroid with a compound selected from the group consisting of trialkoxy orthoformates and carboxylic acid anhydrides, in the presence of an acid catalyst whereby compounds selected from the group consisting of 3-alkoxy-5,19-cyclo-5,10-seco-androsta-1(10),2,4,7-tetraene steroids and 3-carboxylic acyloxy-5,19-cyclo-5,10-seco-androsta-1(10),2,4,7-tetraene steroids are respectively formed; and d. treating said 5,19-cyclo-5,10-seco-androstasteroid formed in step (c) with a mixture of a N-haloimide and an alkali carbonate under reactive conditions whereby said annulene steroid of Formula A is prepared.

23. The process of claim 22, wherein the steroid product of each step is isolated prior to treatment according to the succeeding step.

24. A process for preparing annulene compounds of the formula:

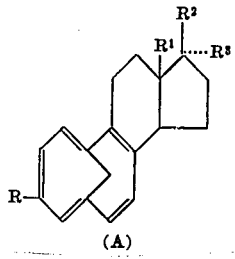

(A)

wherein R is selected from the group consisting of H, lower alkoxy, and carboxylic acyloxy; R¹ is methyl or ethyl; R⁴ is oxo or the group

wherein R² is selected from the group consisting of hydroxy, hydrolyzable carboxylic esters, tetrahydropyran-2'-yloxy, and tetrahydrofuran-2'-yloxy; and R³ is selected from the group consisting of H, lower alkyl, lower alkenyl, lower alkynyl, lower haloalkynyl, cyclopropyl, dichlorocyclopropyl, difluorocyclopropyl propadienyl, dichlorocyclopropynyl, difluorocyclopropynyl, lower alkoxy and carboxylic acyloxy; which comprises the steps of:

a. treating a 19-hydroxy-androsta-4,6-dien-3-one steroid with a 2-chloro-1,1,2-trifluoroalkyl dialkylamine under reactive conditions thereby forming a 5,19-cycloandrosta-1,6-dien-3-one steroid;

b. treating said 5,19-cycloandrosta-1,6-dien-3-one steroid with a compound selected from the group consisting of trialkoxy orthoformates and carboxylic acid anhydrides, in the presence of an acid catalyst whereby compounds selected from the group consisting of 3-alkoxy-5,19-cyclo-5,10-seco-androsta-1(10),2,4,6-tetraene steroid and 3-carboxylic acyloxy-5,19-cyclo-5,10-seco-androsta-1(10),2,4,6-tetrane steroids are respectively formed; and c. treating said 5,19-cyclo-5,10-seco-androstasteroid formed in step (b) with a mixture of a N-haloimide and an alkali carbonate under reactive conditions whereby said annulene steroid of Formula A is prepared.

25. The process of claim 24, wherein the steroid product of each step is isolated prior to treatment according to the succeeding step.

* * * * *